United States Patent Office 2,881,116
Patented Apr. 7, 1959

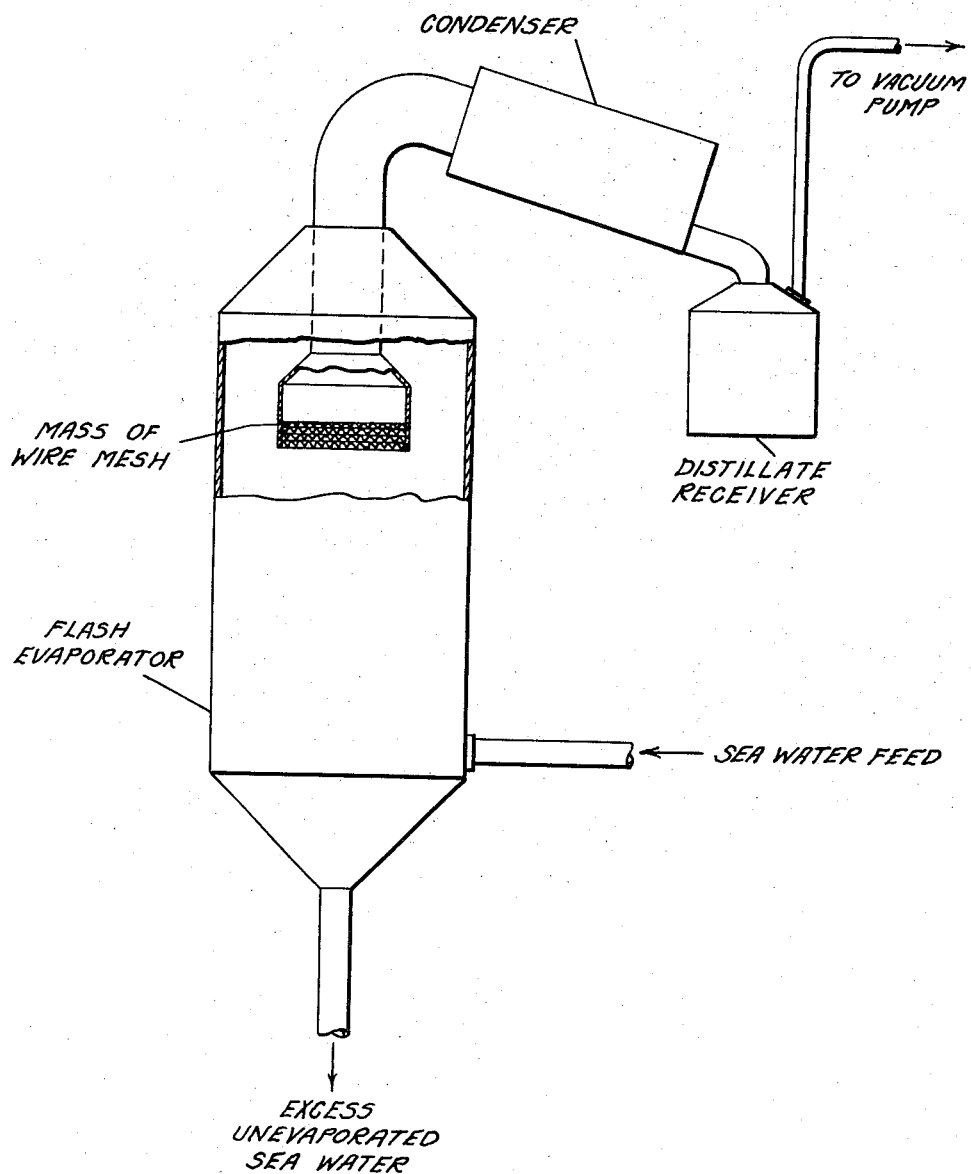

2,881,116

REMOVAL OF ENTRAINED LIQUID PARTICLES FROM VAPOR

Robert E. Siegfried, Lexington, Mass., assignor to Badger Manufacturing Company, Cambridge, Mass., a corporation of Massachusetts Application November 1, 1956, Serial No. 619,676

5 Claims. (Cl. 202—66)

This invention relates to the removal of small entrained particles of liquid from a stream of vapor and pertains more specifically to the purification of sea water by distillation or evaporation.

In the distillation or evaporation of liquids, small particles of the liquid frequently become entrained in the stream of vapor, leading to contamination of the distillate or condensate by such liquid and to loss of effectiveness of distillation or evaporation purification processes. The entrainment of such liquid particles in the stream of vapor is particularly troublesome in the case of flash evaporation of sea water to render it potable, although as indicated above the problem is also present in the distillation of any liquid, particularly at reduced pressure. The expedients commonly employed to alleviate this undesirable situation include, among others, causing the stream of vapor suddenly to change direction one or more times as by means of baffles or the like placed in the path of the stream or by passing the vapor stream through a mass of wire mesh. However, these expedients have not been completely satisfactory, particularly when the entrained particles are of small diameter of the order of 8 microns or less. There have consequently been many efforts to develop special weaves and laminated constructions of wire mesh in order to achieve a high degree of removal of the entrained particles of liquid.

It has now been found that when employing a mass of wire mesh of specified characteristics it is possible to achieve extremely effective removal of entrained liquid particles by maintaining the ratio of the velocity of the vapor stream to the square root of its specific volume during its passage through the mass of wire mesh within certain critical limits. The method of the present invention makes possible the removal of very small entrained liquid particles having diameters of the order of 6 to 8 microns or even less, particles of the type commonly known as fog and which have hitherto been extremely difficult to remove. In addition, it has been found that in the flash evaporation of a liquid such as sea water by introducing a supply or feed of the sea water at elevated temperature into a chamber maintained at reduced pressure, it is possible to control the size of the liquid particles entrained in the stream of vapor within a rather definite range by maintaining the ratio of the feed to the distillate or condensate within certain critical limits, thus enhancing the effectiveness of the remaining steps of the process for removing entrained liquid particles.

The appended drawing is a generally schematic representation of a device in which the present invention is employed.

The wire mesh which has been found to be effective when employed in the process of the present invention is crinkled or knitted wire mesh of the general type commonly employed as a vapor or gas filter material and in which the free volume amounts to 92% to 99.4% of the apparent volume of the mass of wire mesh, the surface area of the wire in the mass amounts to 50 to 500 square feet per cubic foot of the mass, and the diameter of the individual wires forming a part of the mesh is from 0.003 to 0.016 inch. In the case of flash evaporation of sea water, the wire mesh producing best results has a free volume from 96% to 99% of the apparent volume, a surface area of 80 to 150 square feet per cubic foot, and individual wires from 0.090 to 0.130 inch in diameter.

In determining the ratio of velocity to the square root of specific volume of the stream of vapor as it passes through the mass of wire mesh it is essential that consistent units be employed; for example, velocity may be defined in feet per second, in which case specific volume must be measured in cubic feet per pound. It has been found that by maintaining this ratio within the preferred range from 2:1 to 3:1 it is possible to remove upwards of 85% by weight of the entrained liquid particles from the vapor stream, although satisfactory results can also be obtained when the ratio is as low as 1.5:1 or as high as 4:1.

It has also been found that the effectiveness of the method of the present invention can be still further increased, particularly when applied to the evaporation or distillation of sea water, by controlling the ratio of the liquid feed or input to the distillate (or condensate) within certain limits; namely, from 25:1 to 200:1. Optimum results are obtained when the ratio is maintained within range from 30:1 to 75:1.

*Example*

A stream of sea water at a temperature of approximately 163° F. was introduced into the evaporating chamber of a flash evaporator, the pressure within the flash chamber being maintained at approximately 5.1 inches mercury and the temperature at 140° F. Approximately 2.66% by weight of the water was flashed to vapor so that the ratio of feed to distillate was approximately 37.6:1. The specific volume of the vapor was 122.8 cubic feet per pound at these temperature and pressure conditions.

When the vapor was condensed directly, without passing it through wire mesh, the condensate was found to have a salinity (solids content) of 28.0 p.p.m., indicating the presence of approximately 0.08% of entrained sea water in the vapor.

A four-inch thick section (measured in the direction of vapor travel) composed of twenty layers of crinkled Monel wire pads was then interposed in the path of the vapor stream. The diameter of the individual wires in the pads was 0.011 inch, the free volume of the section was 97.7% of the apparent volume, and the surface area was 110 square feet per cubic foot. The area of the pad presented to the vapor stream was such that the velocity of the vapor through the pad was 28 feet per second, so that the ratio of the velocity to the square root of the specific volume was 2.5:1. Under these conditions the salinity of the condensed distillate was found to be about 4.7 p.p.m., indicating removal of more than 83.2% of the entrained water particles by the wire mesh pads.

Substantially the same results were obtained with pads having a thickness from three to eight inches measured in the direction of travel of the vapor stream and with varying ratios of feed to distillate from 30:1 to 75:1 and with varying ratios of vapor velocity to the square root of specific volume from 2:1 to 3:1.

Variation of the ratios beyond the preferred ranges set forth above as well as variation of the characteristics of the wire mesh pad led to some decrease in effectiveness of removal of the entrained sea water particles, but satisfactory results could still be obtained within the broad limits defined in the preceding specification.

Although specific embodiments of the invention have been defined herein, it is not intended to limit the invention solely thereto, but to include all of the obvious variations and modifications within the spirit and scope of the appended claims.

I claim:

1. The method of separating small entrained particles of liquid having a diameter of the order of 8 microns or less from a stream of vapor which comprises passing said stream through a mass of wire mesh in which the free volume is from 92% to 99.4% of the apparent volume, the surface area is from 50 to 600 square feet per cubic foot and the diameter of the individual wires is from 0.003 to 0.016 inch, and maintaining the ratio of the velocity of the vapor to the square root of its specific volume within the range from 1.5:1 to 4:1 during its passage through said mass.

2. The method of separating small entrained particles of liquid having a diameter of the order of 8 microns or less from a stream of vapor which comprises passing said stream through a mass of wire mesh in which the free volume is from 92% to 99.4% of the apparent volume, the surface area is from 50 to 600 square feet per cubic foot and the diameter of the individual wires is from 0.003 to 0.016 inch, the thickness of said mass being from 3 to 8 inches measured in the direction of said stream, and maintaining the ratio of the velocity of the vapor to the square root of its specific volume within the range from 1.5:1 to 4:1.

3. The method of separating small entrained particles of liquid having a diameter of the order of 8 microns or less from a stream of vapor which comprises passing said stream through a mass of wire mesh in which the free volume is from 92% to 99.4% of the apparent volume, the surface area is from 50 to 600 square feet per cubic foot and the diameter of the individual wires is from 0.003 to 0.016 inch, the thickness of said mass being from 3 to 8 inches measured in the direction of said stream, and maintaining the ratio of the velocity of the vapor to the square root of its specific volume within the range from 2:1 to 3:1.

4. The method of purifying sea water which comprises providing a sea water feed at an elevated temperature, subjecting said feed to a reduced pressure to evaporate a portion thereof to form a stream of vapor containing small entrained particles of sea water having a diameter of the order of 8 microns or less, removing said entrained particles from said stream by passing it through a mass of wire mesh in which the free volume is from 92% to 99.4% of the apparent volume, the surface area is from 50 to 600 square feet per cubic foot and the diameter of the individual wires is from 0.003 to 0.016 inch, while maintaining the ratio of the velocity of the vapor to the square root of its specific volume within the range from 1.5:1 to 4:1, and condensing the vapor from which said entrained particles have been removed while maintaining the ratio of feed to condensate within the range from 25:1 to 200:1.

5. The method of purifying sea water which comprises providing a sea water feed at an elevated temperature, subjecting said feed to a reduced pressure to evaporate a portion thereof to form a stream of vapor containing small entrained particles of sea water having a diameter of the order of 8 microns or less, removing said entrained particles from said stream by passing it through a mass of wire mesh in which the free volume is from 96% to 99% of the apparent volume, the surface area is from 80 to 150 square feet per cubic foot and the diameter of the individual wires is from 0.090 to 0.130 inch, while maintaining the ratio of the velocity of the vapor to the square root of its specific volume within the range from 2:1 to 3:1, and condensing the vapor from which said entrained particles have been removed while maintaining the ratio of feed to condensate within the range from 30:1 to 75:1.

References Cited in the file of this patent

UNITED STATES PATENTS

| | | |
|---|---|---|
| 56,863 | Prentiss et al. | July 31, 1866 |
| 558,984 | Potter | Apr. 28, 1896 |
| 1,317,688 | Davenport | Oct. 7, 1919 |
| 2,049,979 | Tucker | Aug. 4, 1936 |
| 2,575,051 | Egger et al. | Nov. 13, 1951 |
| 2,812,038 | Krueger | Nov. 5, 1957 |

UNITED STATES PATENT OFFICE
CERTIFICATE OF CORRECTION

April 7, 1959

Patent No. 2,881,116

Robert E. Siegfried

It is hereby certified that error appears in the printed specification of the above numbered patent requiring correction and that the said Letters Patent should read as corrected below.

Column 2, line 8, and column 4, lines 26 and 27, for "0.090 to 0.130 inch, each occurrence, read -- 0.009 to 0.013 inch --.

Signed and sealed this 15th day of December 1959.

(SEAL)
Attest:

KARL H. AXLINE
Attesting Officer

ROBERT C. WATSON
Commissioner of Patents